2,906,644
Patented Sept. 29, 1959

2,906,644
METHOD OF SEALING INTERSTICES IN REFRACTORY MATERIALS AND APPARATUS MADE OF THE SAME

Ernst Scheuer, Stone, and Thomas John Howells, Aylesbury, England, assignors to International Alloys Limited, Aylesbury, England No Drawing. Application June 5, 1956
Serial No. 589,388

Claims priority, application Great Britain June 22, 1955

12 Claims. (Cl. 117—71)

This invention relates to a method of sealing pores and joints in refractory material against penetration by liquid metals. It is particularly concerned with the sealing against liquid metal under medium hydrostatic pressure. Most liquid metals have a considerable surface tension and do not leak through the pores of the normal refractories under the low hydrostatic pressure encountered in open vessels. Even screwed joints can be considered impervious to liquid metal in many cases under these conditions. As soon as the liquid metal is under higher hydrostatic pressure in the order of 1 atmosphere, penetration occurs in many cases by the pressure overcoming the surface tension and forcing the liquid metal through the pores and the narrow passages in the joints. The use of refractory cements which is common in making joints of refractory parts, has been found ineffective in preventing this leakage. Even suspensions of colloidal particles, for example of graphite, have not been effective in sealing pores and joints under medium hydrostatic pressure.

The present invention makes use of the liquid metal itself in order to produce an effective seal. It is based on the discovery that leakage through the passages or pores can be avoided if a substance is introduced into them, in finely divided form, which forms with the liquid metal a high melting compound. The liquid metal when starting to penetrate into the passages will on the surface of contact with the substance give rise to the appearance of a layer of high melting material which fills the passage completely, and thus seals it off.

In the following table suitable substances for producing high melting compounds with the metals aluminium, zinc, lead and tin are listed by way of examples. In the table the melting points of the liquid metals and of the high melting compounds likely to be formed are indicated in ° C. below the symbols of the respective elements.

| Liquid Metal | Sealing Substance |
|---|---|
| Al 660 | Fe, Ti, Co, Cr<br>~1,158  1,355  1,828  2,000 |
| Zn 419 | Fe >765 |
| Pb 327 | Ca, S<br>650  1,110 |
| Sn 232 | Fe, Mn<br>909  989 |

Substances forming a high melting compound will only produce effective seals if this high melting compound is only soluble to a small degree in the liquid metal at the temperatures under which the seal operates.

The same principle can be applied to alloys consisting of various metals provided that the sealing substance forms an intermetallic compound of the desired high melting point with at least one constituent of the alloy. However, in the case of alloys having a main constituent it is preferable to use a substance forming a high melting compound with the main constituent. In the following therefore the expression "metal" may refer to a substantially pure metal, to impure metal or to an alloy containing several metals, the expression "substance" is intended to include any substance which forms a high melting compound with any metal or metals contained in the alloy and the expression "high melting compound" is intended to include any alloy or intermetallic or other compound formed by the action of a "metal" on a "substance."

In the case of joints, the substance used for sealing is best introduced as a paste applied to the sealing faces for instance crew threads. The choice of the carrier liquid in this paste has a considerable influence on the usefulness and the efficiency of the sealing process. It has been found that oil and grease as carrier liquids do not readily form good seals. These substances decompose when the seal is heated and develop gases and thus possibly produce porosity in the paste which cannot be readily sealed by formation of high melting compounds. It is also possible that the residue of the greasy compounds covers up the particles of the sealing substance and prevents contact between the sealing substance and the liquid metal, thus preventing formation of the high melting compound which effects the seal.

Water as a carrying liquid is effective in so far as good sealing may be obtained. It is, however, far from convenient owing to the fact that, on application of the paste to the surfaces to be joined, the water seeps away into the refractory parts so quickly that the paste sets, making it impossible to screw home the joint. It has been found that by incorporating small amounts of colloidal or high molecular weight substances such as starch paste, gum arabic or waterglass, into a water carrying liquid, this difficulty can be overcome and a paste obtained that behaves very much like a paste made up with a lubricant as carrier. The amount of the colloidal or high molecular weight substance that is sufficient for this purpose will depend on the nature of the pores and passages to be sealed of the refractory material and of the other constituents of the paste. In this connection any substance which makes the paste of the desired plasticity is considered as a colloidal or high molecular weight substance and the amount necessary can most easily be found by making consecutive small additions until a paste is formed that is plastic and remains so in contact with refractory material for a considerable time. If for instance starch is used to enhance the plasticity of a suspension of 20% iron in water for sealing graphite connections in a plant in contact with liquid aluminium the starch may be added to give concentrations of 1, 10 and 20% of the water. Instead of water, low boiling organic substances such as alcohol, ether, acetone, chloroform and the like can also be used as carriers. Preferably a small amount of nonoil-containing lubricating substance is added.

If pores in the refractory have to be sealed, the sealing substance is best introduced into the pores in the form of a solution which is applied to the refractory by soaking with or without the application of a pressure difference, and thereafter the dissolved substance is deposited from the solution by evaporation of the solvent. The pressure difference may be brought about by the atmospheric pressure when one side of the wall of the apparatus is evacuated or by applying a pressure higher than atmospheric from one side of the wall. If the sealing substance itself is not soluble as such, it can be brought into solution as a chemical compound and after introducing this solution into the pores of the refractory and evaporating the solvent, the sealing substance can be set free from this compound by a chemical reaction either by applying a suitable chemical reagent or by applying heat to bring about thermal decomposition. In some cases the liquid metal itself can serve as a decomposing reagent.

For example, sulphur can be applied in solution in carbon disulphide. In the case of liquid aluminium, metals such as iron, nickel, cobalt can be applied as aqueous solutions of salts, the decomposition of this salt being effected at elevated high temperature by reaction either with the graphite or with the liquid aluminium, with formation of free metal on the one hand and such compounds as carbon monoxide, aluminium chloride or aluminium oxide on the other hand. After this the liquid aluminium will produce high melting compounds with the metal set free.

The present invention therefore consists in a method of sealing interstices in refractory materials and apparatus made of the same which is used in contact with metals at temperatures at which the said metals are at least partially molten against penetration by the said liquid metals by introducing into the said interstices a substance in dispersed form which forms with the said metals a compound of a melting point above the said temperature of use of the said apparatus. In this connection the expression "interstices" is to be understood as comprising both the pores inherent in the material and the passages leading to leakage which occur when joints between parts of the apparatus are made.

The following example illustrates the efficiency of the process according to the invention. For the handling of liquid aluminium in a graphite apparatus under a pressure of 1 atmosphere it was necessary to provide definitely leak-proof screwed joints between pipes. To test these joints a 3" outside diameter graphite tube, with female thread 2" diameter at the bottom end was cemented into a tubular steel cap, the top end of which was fitted with a window and branch tube for vacuum pump connection. A threaded plug was then screwed into the bottom end of the graphite tube. For testing, this end was submerged into liquid metal at 800–900° C. to a depth of 3" above the screwed joint. By operating the vacuum pump the liquid aluminium was allowed to act on the joints under a pressure of 1 atmosphere. The following sealing compounds were used for jointing.

(1) Graphite powder, grain size of about 170 mesh with about 4 times its weight of water as carrier.
(2) The same graphite powder with about five times its weight of mineral oil as carrier.
(3) Colloidal graphite suspended in water (Aquadag).
(4) Colloidal graphite suspended in oil (Oildag).
(5) Iron powder (electrolytic), grain size<300 mesh suspended in about 2½ times its weight of water.
(6) The same iron powder suspended in about 3 times its weight of mineral oil.
(7) The same powder suspended in about 4 times its weight of water containing about 15% of starch paste.

The various pastes were applied to the screwed thread and shoulder, then the plug screwed home, after which the joints were dried first at room temperature then at about 200° C., the temperature rising slowly to 650° C. The joint was then immersed in liquid aluminium at about 800–900° C. and vacuum applied to the inside of the tube, so that the liquid aluminium was acting on the joint from outside under a pressure of 1 atmosphere. The penetration of aluminium through the joint could be observed through the window provided at the top end of the steel housing, any leakage appearing as a pool of metal in the graphite tube. All joints except the two sealed with iron powder and water showed penetration of liquid aluminium into the screw threads soon after the start of the test, most of them failing by liquid aluminium leaking through into the graphite tube after less than 3 hours. The joints made up with iron powder and pure water lasted on the average 8 hours, and the penetration of liquid metal along the screw threads was much less pronounced than with the joints sealed with graphite. The joints treated with iron powder, water and starch had no leak and no penetration of metal in the joints after exposure periods of 27 to 46 hours, eight joints on the whole having been tested.

We claim:

1. A method of sealing interstices in refractory materials and apparatus made of the same and used in contact with metal at a temperature at which the said metal is at least partially liquid, against penetration by the said liquid metal, which comprises introducing into said interstices in the absence of said liquid metal a substance dispersed in a carrier of the class consisting of water and low boiling point organic solvents, and contacting said substance with said metal at said temperature to form, as an agent sealing for an indefinite period, a compound which has a melting point above said temperature and is soluble at said temperature only to a small degree in said metal.

2. A method of sealing interstices in refractory materials and apparatus made of the same and used in contact with metal at a temperature at which the said metal is at least partially liquid, against penetration by the said liquid metal, which comprises introducing into said interstices in the absence of said liquid metal a substance dispersed in a carrier of the class consisting of water and low boiling point organic solvents, and contacting said substance with said metal at said temperature to form, as an agent sealing for an indefinite period, a compound which has a melting point above said temperature and is soluble at said temperature only to a small degree in said metal, the introduction of said substance into said interstices being accelerated by applying a pressure difference.

3. A method of sealing interstices in refractory materials and apparatus made of the same and used in contact with metal at a temperature at which the said metal is at least partially liquid, against penetration by the said liquid metal, which comprises introducing into said interstices in the absence of said liquid metal a substance dispersed as a paste in a carrier liquid of the class consisting of water and low boiling point organic solvents to which a colloidal substance has been added to increase the plasticity of the paste, and contacting said first-named substance with said metal at said temperature to form, as an agent sealing for an indefinite period, a compound which has a melting point above said temperature and is soluble at said temperature only to a small degree in said metal.

4. A method of sealing interstices in refractory materials and apparatus made of the same and used in contact with metal at a temperature at which the said metal is at least partially liquid, against penetration by the said liquid metal, which comprises introducing into said interstices in the absence of said liquid metal a substance dispersed as a paste in water to which starch has been added to increase the plasticity of the paste, and contacting said substance with said metal at said temperature to form, as an agent sealing for an indefinite period, a compound which has a melting point above said temperature and is soluble at said temperature only to a small degree in said metal.

5. A method of sealing interstices in refractory materials and apparatus made of the same and used in contact with metal at a temperature at which the said metal is at least partially liquid, against penetration by the said liquid metal, which comprises introducing into said interstices in the absence of said liquid metal a substance dispersed in a carrier of the class consisting of water and low boiling point organic solvents, evaporating said carrier, and contacting said substance with said metal at said temperature to form, as an agent sealing for an indefinite period, a compound which has a melting point above said temperature and is soluble at said temperature only to a small degree in said metal.

6. A method of sealing interstices in refractory materials and apparatus made of the same and used in contact with metal at a temperature at which the said metal is at least partially liquid, against penetration by the said liquid metal, which comprises introducing into said interstices in the absence of said liquid metal a chemical compound of a substance dispersed in a carrier of the class consisting of water and low boiling point organic solvents, and contacting said chemical compound with said metal at said temperature to release said substance by chemical reaction between said chemical compound and metal, said substance and metal thereupon forming, as an agent sealing for an indefinite period, a compound which has a melting point above said temperature and is soluble at said temperature only to a small degree in said metal.

7. A method of sealing interstices in refractory materials and apparatus made of the same and used in contact with metal at a temperature at which the said metal is at least partially liquid, against penetration by the said liquid metal, which comprises introducing into said interstices in the absence of said liquid metal a chemical compound of a substance dispersed in a carrier of the class consisting of water and low boiling point organic solvents, and contacting said chemical compound with said metal at said temperature to release said substance by thermal decomposition of said chemical compound, said substance and metal thereupon forming, as an agent sealing for an indefinite period, a compound which has a melting point above said temperature and is soluble at said temperature only to a small degree in said metal.

8. A method of sealing interstices in refractory materials and apparatus made of the same and used in contact with aluminium at a temperature above its melting point, against penetration by liquid aluminium, which comprises introducing into said interstices in the absence of liquid aluminium a substance of the class consisting of iron, titanium, cobalt and chromium dispersed in a carrier of the class consisting of water and low boiling point organic solvents, and contacting said substance with aluminium at said temperature to form, as an agent sealing for an indefinite period, a compound which has a melting point above said temperature and is soluble at said temperature only to a small degree in said aluminium.

9. A method of sealing interstices in refractory materials and apparatus made of the same and used in contact with zinc at a temperature above its melting point, against penetration by liquid zinc, which comprises introducing into said interstices in the absence of said liquid zinc iron dispersed in a carrier of the class consisting of water and low boiling point organic solvents, and contacting said iron with said zinc at said temperature to form, as an agent sealing for an indefinite period, a compound which has a melting point above said temperature and is soluble at said temperature only to a small degree in said zinc.

10. A method of sealing interstices in refractory materials and apparatus made of the same and used in contact with lead at a temperature above its melting point, against penetration by liquid lead, which comprises introducing into said interstices in the absence of said liquid lead a substance of the class consisting of calcium and sulphur dispersed in a carrier of the class consisting of water and low boiling point organic solvents, and contacting said substance with said lead at said temperature to form, as an agent sealing for an indefinite period, a compound which has a melting point above said temperature and is soluble at said temperature only to a small degree in said lead.

11. A method of sealing interstices in refractory materials and apparatus made of the same and used in contact with tin at a temperature above its melting point, against penetration by liquid tin, which comprises introducing into said interstices in the absence of said liquid tin a substance of the class consisting of iron and manganese dispersed in a carrier of the class consisting of water and low boiling point organic solvents, and contacting said substance with said tin at said temperature to form, as an agent sealing for an indefinite period, a compound which has a melting point above said temperature and is soluble at said temperature only to a small degree in said tin.

12. A method of sealing interstices in refractory materials and apparatus made of the same and used in contact with metal at a temperature at which the said metal is at least partially liquid, against penetration by the said liquid metal, which comprises introducing into said interstices in the absence of said liquid metal a substance dispersed as a paste in a carrier liquid of the class consisting of water and low boiling organic solvents to which a high molecular weight substance has been added to increase the plasticity of the paste, and contacting said first-named substance with said metal at said temperature to form, as an agent sealing for an indefinite period, a compound which has a melting point above said temperature and is soluble at said temperature only to a small degree in said metal.

References Cited in the file of this patent

UNITED STATES PATENTS

| | | |
|---|---|---|
| 1,331,816 | McKnight | Feb. 24, 1920 |
| 1,454,068 | Myers et al. | May 8, 1923 |
| 1,694,730 | Bleecker | Dec. 11, 1928 |
| 1,902,059 | Critchett | Mar. 21, 1933 |
| 1,981,403 | Weitzenkorn | Nov. 20, 1934 |
| 2,066,564 | Hansgirg | Jan. 5, 1937 |
| 2,090,408 | Vance | Aug. 17, 1937 |
| 2,124,445 | Carrington | July 19, 1938 |